Patented Apr. 27, 1937

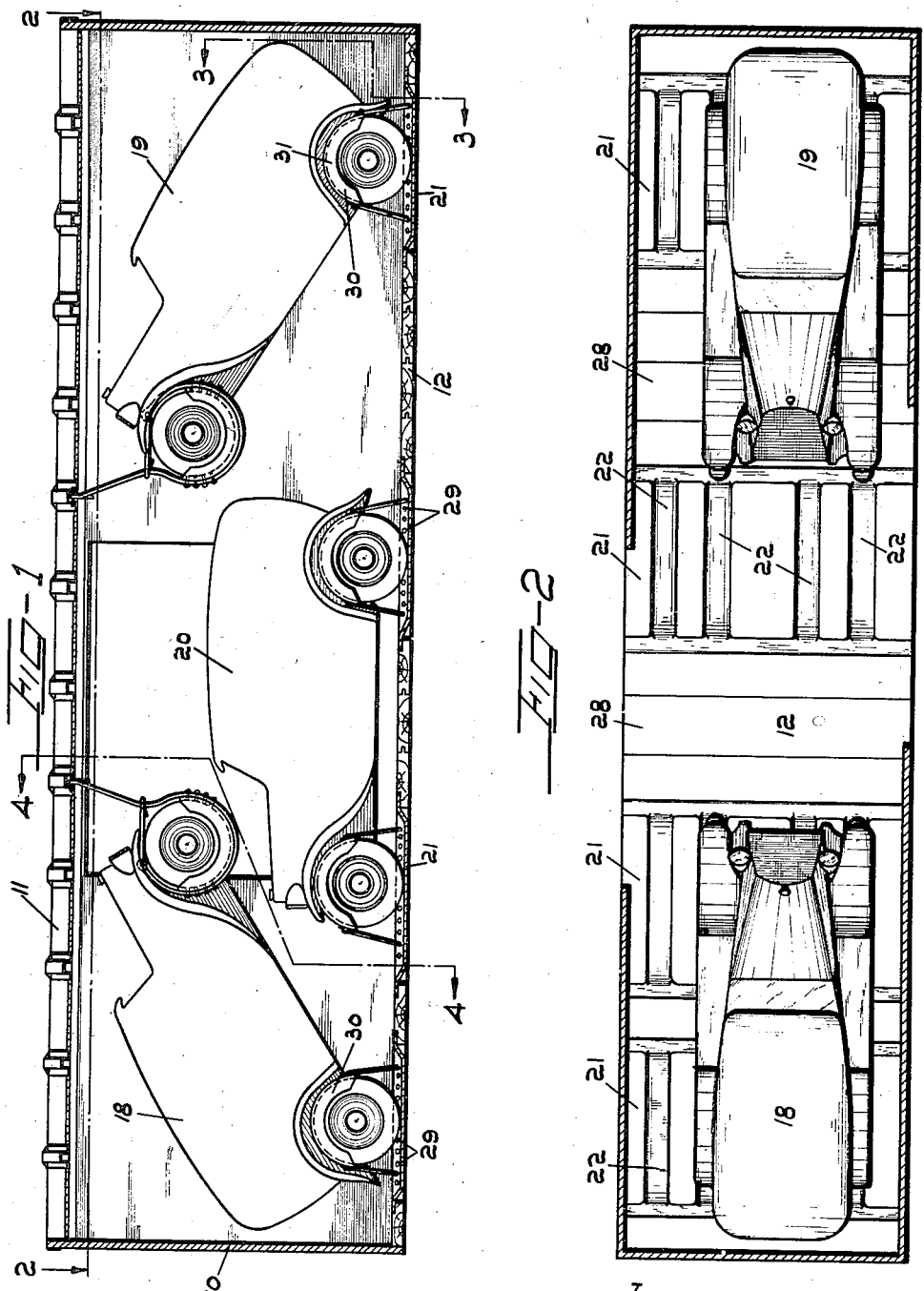

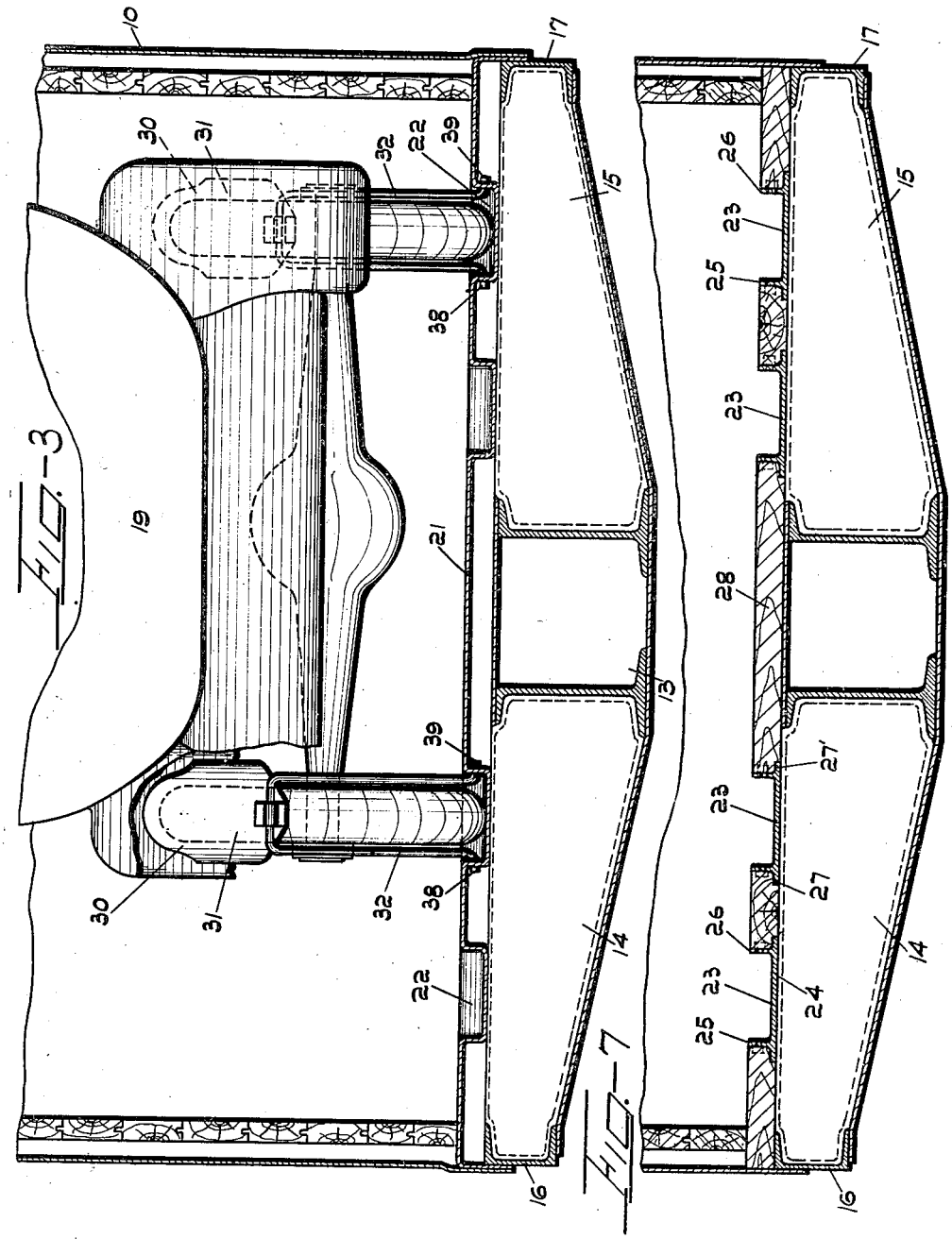

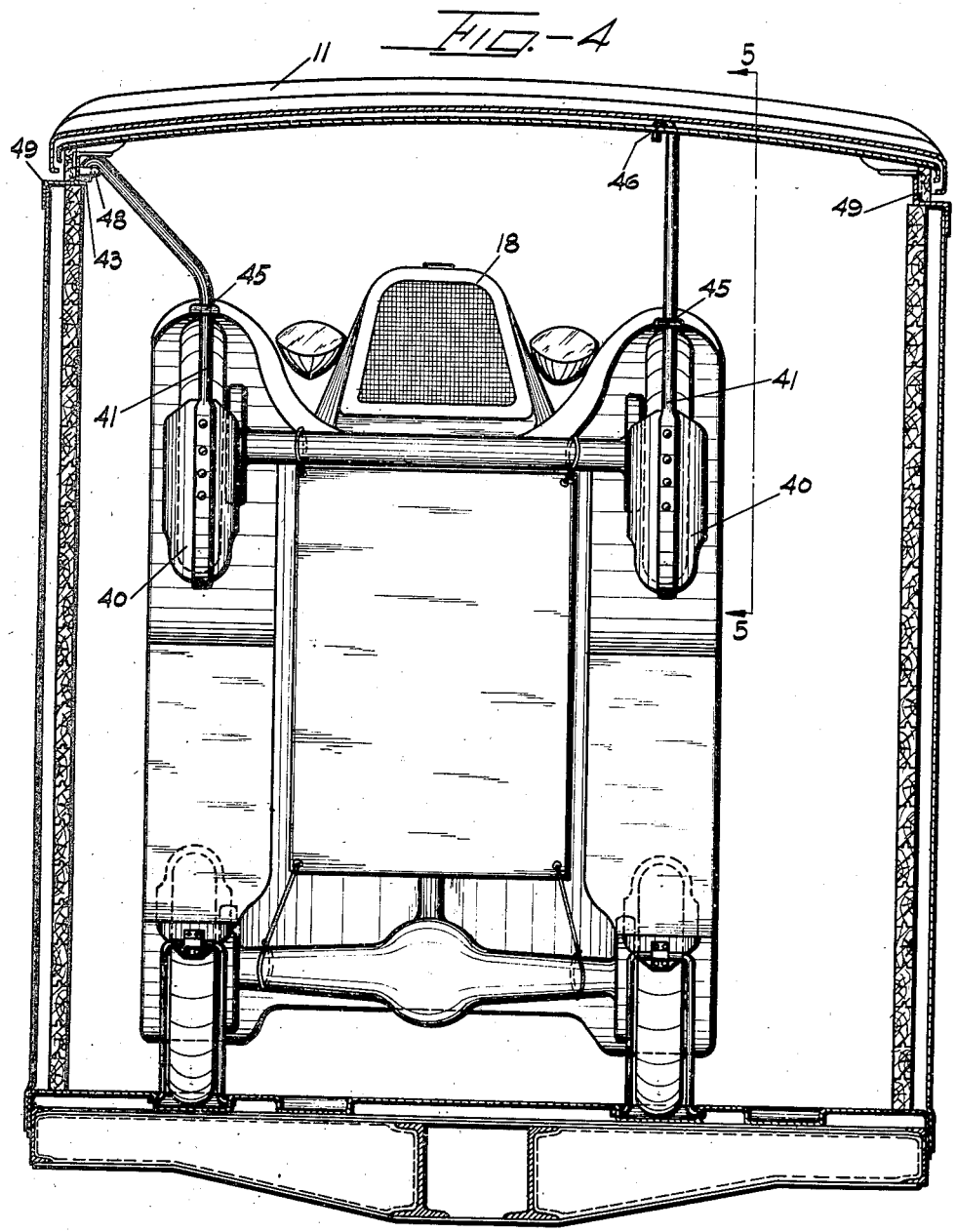

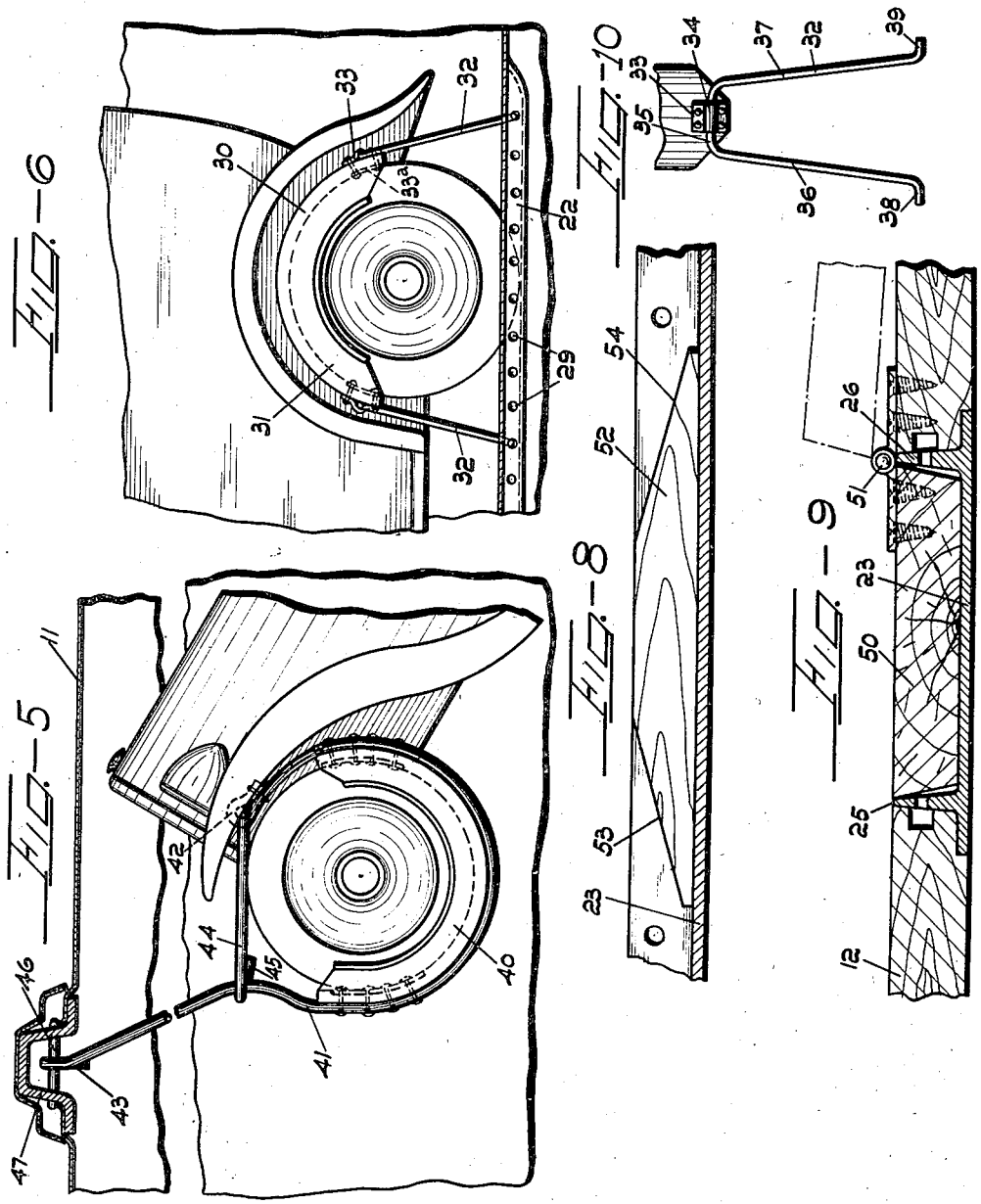

2,078,700

UNITED STATES PATENT OFFICE 2,078,700

VEHICLE ANCHORING DEVICE

Kenneth J. Tobin, Chicago, Ill., assignor, by mesne assignments, to Evans Products Company, Detroit, Mich., a corporation of Delaware Application October 17, 1931, Serial No. 569,420

2 Claims. (Cl. 105—368)

This invention relates to anchoring devices for automobiles.

It is an object of this invention to provide anchoring devices for vehicles and particularly for automobiles which shall be simple, inexpensive and effective to maintain said vehicles against movement during transit in a carrier.

A further object is the provision of anchoring devices adapted to secure the front part of automobiles as well as the rear thereof in fixed position.

A further object is the provision of anchoring devices utilizing discarded pneumatic tire casings in their construction.

A further object resides in the construction of anchoring devices whereby a portion of an automobile may be suspended from the roof structure of a freight car.

A further object lies in the provision of anchoring devices applicable to the wheels of automobiles to maintain said automobiles against shifting relative to their carriers during transit.

Another object is the provision of a novel method of anchoring automobiles against shifting relative to their carriers during transit.

Another object is the provision of members secured to the floors of carriers provided with channels or wells for receiving the wheels of automobiles and having means for retaining anchoring devices for said wheels.

A further object is the provision of anchoring devices applicable to the wheels of automobiles which embody a portion of a tire casing partly embracing a wheel and having flexible securing means depending therefrom for engagement with a fixed part of the carrier in which said automobiles are shipped.

A further object is the provision of metallic plates adapted to be secured to an automobile carrier and provided with depressed portions in which the wheels of automobiles and the like to be shipped may be received.

A further object is the provision of channel members adapted to constitute a portion of the floors of vehicle carriers, the channels of said members being adapted to receive wheels of said vehicles.

A further object is the provision of channel members forming a portion of the floors of vehicle carriers, the members being provided with fillers hinged to said floors and adapted to be seated within the channels to provide a flush floor construction, whereby said carriers are adapted for carrying general commodities other than vehicles.

Other objects of this invention will appear as the description thereof proceeds.

In the accompanying drawings forming a part of this specification:

Figure 1 is a longitudinal sectional view through a vehicle carrier of the railway house car type illustrating the application of this invention to a plurality of automobiles loaded therein.

Figure 2 is a sectional view taken on line 2—2 of Figure 1 with one of the automobiles omitted to illustrate more clearly the construction of the novel floor plates.

Figure 3 is a fragmentary sectional view taken on line 3—3 of Figure 1, parts being broken away to more clearly show the novel anchoring devices.

Figure 4 is a sectional view taken on line 4—4 of Figure 1.

Figure 5 is a fragmentary sectional view taken on line 5—5 of Figure 4.

Figure 6 is an enlarged fragmentary elevation of an automobile to which an anchoring device of the invention is applied, the floor plate being shown in section.

Figure 7 is a fragmentary transverse sectional view showing another form of floor member.

Figure 8 is a partial sectional view of the floor plate shown in Figure 7, illustrating a block which may be used in unloading automobiles from the carrier.

Figure 9 is a partial sectional view of the form of floor member shown in Figure 7, illustrating the hinged type of filler which may be used when a flush floor construction is desired.

Figure 10 is a fragmentary end view of the novel anchoring device showing the construction of the securing elements before said device is applied to the wheel of the vehicle.

Referring to the drawings, numeral 10 indicates generally a carrier of the railway house car type. The car is provided with a roof 11, a floor 12 and, as clearly shown in Figure 3 of the drawings, the house car is provided with the customary center sill 13, cross-bearers 14 and 15 and side sills 16 and 17.

One arrangement of automobiles for shipment in the house car 10 is illustrated in Figure 1 of the drawings. In this arrangement the automobile 18 is inclined upwardly from its rear toward its front end and is maintained in fixed position relative to the car by means engaging the front wheels thereof for suspending the front end of the car and by other means engaging the rear wheels thereof to maintain them in fixed position relative to the sub-structure of the car.

The automobile 19 is similarly inclined and similarly maintained in fixed position. The intermediate automobile 20 is arranged so that its wheels rest upon the floor of the car.

In order to permit securement of the automobile by means engaging the wheels thereof to maintain said wheels upon the floor of the car 10 and in fixed relationship thereto the floor 12 is modified from the construction of floor ordinarily utilized in house cars of the type shown. In one modification of the usual floor structure of railway house cars a plurality of transverse longitudinally spaced plates 21 are employed, the arrangement of these plates preferably being that illustrated in Figure 2 of the drawings. Each of the plates 21 may extend entirely across the width of the car as illustrated in Figure 3 of the drawings and have the ends thereof bent downwardly in overlapping relationship to the side sills 16 and 17 to which they are secured. The plates 21 are provided with spaced channels 22 arranged in pairs on opposite sides of the center line of the car as indicated in Figure 3 of the drawings. By this arrangement of the channels in the plates 21 it is possible to stagger the automobiles in the car by positioning the wheels of said automobiles in said channels to obtain the desired location of each automobile.

A structural embodiment of a further modification of the customary floor construction of freight house car is illustrated in Figures 7, 8 and 9 of the drawings. In this embodiment longitudinally extending channel members 23 are employed. Each of these channel members preferably rests directly upon and is secured to the cross-bearers 14 and 15 of the underframe of the car. Each of the channel members constitutes a web 24, substantially vertically extending flanges 25 and 26 and preferably horizontally extending flanges 27 and 27' projecting beyond the vertical flanges. As clearly shown in Figure 7 of the drawings the channel members 23 are spaced transversely of the car and arranged in pairs in substantially the manner referred to in connection with the channeled portions of the plates 21. Moreover, the channel members 23 preferably extend the entire length of the floor.

In each of the modifications of the floor construction described above the intervals between the channeled plates 21 and the channeled members 23 are covered by the customary floor boards 28. Furthermore, in each of the above described embodiments the vertical flanges of the channels 22 and 23 are provided with a series of spaced perforations 29, adapted to receive selectively the securing rods included in the anchoring device.

The anchoring device 30 embodies an intermediate flexible portion 31 adapted, as clearly shown in Figures 6 of the drawings, to embrace a portion of the wheel of an automobile to which it is applied. This flexible portion 31 of the anchoring device may be of any desired construction or material but it is found that portions of discarded tire casings are well adapted to serve as the flexible portions of the anchoring devices and it is preferred to employ such casings. Extending from the ends of the flexible intermediate portion 31 are a plurality of securing rods 32. Each of these rods is pivotally secured to the flexible portion 31 and for this purpose a plate 33, having an intermediate outwardly offset portion 34, may be utilized. The plate 33 is preferably secured to the flexible portion by means of a plurality of rivets lying on opposite sides of the offset portion 34 and extending through a substantially flat plate 33ᵃ positioned on the inner side of the flexible intermediate portion. The securing rods 32 preferably take the form of inverted U shaped members and constitute a bight portion 35 and downwardly and outwardly diverging legs 36 and 37 which are provided with outwardly extending ends 38 and 39. The anchoring device 30 is employed to secure the wheels of an automobile to the floor of the car in which said automobile is shipped.

A slight modification of the anchoring device 30 is made where such device is to be adapted for suspending either end of an automobile from the superstructure of a freight car. Referring to Figure 5 of the drawings, there is disclosed an anchoring device embodying a flexible portion 40 which may be formed of a length of salvaged tire casing to which is secured in any desired manner a strap member 41. One end of the strap member is formed to constitute an eye 42, while the other end is extended and provided with a hook portion 43, by means of which the anchoring device is adapted to be secured to a portion of the superstructure of the car. Pivotally supported within the eye 42 of the strap 41 is a tie rod 44, adapted to engage the strap member 41 to secure said member to the wheel of an automobile to which it is applied. For this purpose the tie rod 44 is bent as indicated at 45 to embrace an intermediate portion of the strap member. As clearly indicated in Figures 4 and 5, the automobile, in its inclined position, may be supported by engagement of the hook portion 43 of the strap member 41 with a pin 46 secured to the carline 47 forming a part of the superstructure of the car. The suspended position of the automobile may also be maintained by means of engagement of the strap member 41 with a stirrup 48 provided on the side plate 49 of the car superstructure. While Figure 4 of the drawings discloses an anchoring member secured to the carline and an anchoring member secured to the stirrup of the side plate, it is to be understood that both anchoring members, if desired, may be supported from the carlines or from the side plates of the superstructure.

Referring to Figure 9 of the drawings, there is disclosed a construction by which the freight car may be adapted for shipment of commodities other than automobiles. To effect this purpose it is necessary for the shipment of some commodities that the channels in the plate members 21 and the channel members 23 be covered. In the construction illustrated in Figure 9 of the drawings a filler member 50 is hinged, as indicated at 51, to the floor of the car so that when desired said filler member may be swung from the position shown in dot and dash lines into the channels to provide a substantially flush floor condition. This construction, it is to be understood, is applicable as well to the plate members 21 as to the channel members 23.

Where the channel members 23 are provided in the floor of a freight car it is found desirable to provide means for readily moving the wheels of the automobile out of said channel members in unloading of the freight car in which said automobile is carried. For this purpose a block 52, having oppositely tapering ends 53 and 54 is utilized. This block, in the unloading of the automobiles, is placed within the channel member and the automobile may then, obviously, be readily unloaded from the car.

A novel method of application of the anchoring device 30 is utilized in its application to the wheels of an automobile. The automobile is first loaded into the freight car with the desired wheels resting within the channel portions provided in the floor. The air within said wheels is then released sufficiently to permit ready engagement of the flexible intermediate portion of the anchoring device around the periphery of said wheel. When this has been accomplished the holding rods 32 are compressed laterally so that the ends 38 and 39 thereof may be sprung into the desired apertures 29 formed in the flanges of the channel portions. The natural resiliency provided in the holding rods will insure retention of the ends 38 and 39 in said apertures. After such engagement air is again forced into the wheels so as to bring about a secure frictional engagement between said wheels and the flexible portion of the anchoring device, as well as secure engagement between the ends of the securing rods and the apertures in which they are positioned. It is apparent that the utilization of this method securely holds the wheels of the automobile in the desired position against movement either in a vertical or lateral direction.

The application of the anchoring device by which the automobile may be suspended from the roof of a freight car is believed to be apparent from the description of said device. The automobile is first raised to its desired angular position relative to the floor of the car. The anchoring device is then applied in embracing relationship to the wheels on the automobile, engagement is effected between the tie rod 44 and the strap member 41 and the hooked end 43 of the strap member is then engaged with a portion of the roof structure provided for this purpose.

It is apparent that numerous changes in the details of the structures embodying the invention may be made without departing from the spirit thereof and it is intended that all such changes be comprehended within the invention, which is to be limited only by the scope of the claims appended hereto.

I claim:

1. An anchoring device for suspending automobiles for shipment in freight cars, comprising a wheel engaging member, a swingable rod secured thereto adjacent an end thereof, a second rod secured adjacent the opposite end of said wheel engaging member and adapted to be secured to the superstructure of the car, said rods having locking engagement with each other in the operative position of said device.

2. An anchoring device for suspending automobiles for shipment in freight cars, comprising a length of tire casing adapted to embrace a wheel of said automobile, a metallic strap secured exteriorly to said casing, one end of said strap being formed to be supported from a fixed part of the car, a bar pivotally secured to the other end of said strap, said strap and said bar being adapted for locking engagement with each other in the operative position of said device.

KENNETH J. TOBIN.